United States Patent
Fulton et al.

(10) Patent No.: US 10,120,664 B2
(45) Date of Patent: *Nov. 6, 2018

(54) INCREMENTAL BUILD GENERATION

(71) Applicant: International Business Machines Corporation, Armonk, NY (US)

(72) Inventors: Michael S. Fulton, Squamish (CA); Gary I. Mazo, San Jose, CA (US); Brian W. Svihovec, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/838,402

(22) Filed: Aug. 28, 2015

(65) Prior Publication Data
US 2017/0060550 A1    Mar. 2, 2017

(51) Int. Cl.
| *G06F 9/44* | (2018.01) |
| *G06F 9/45* | (2006.01) |
| *G06F 8/41* | (2018.01) |
| *G06F 8/71* | (2018.01) |
| *G06F 8/20* | (2018.01) |
| *G06F 8/60* | (2018.01) |

(52) U.S. Cl.
CPC .............. *G06F 8/433* (2013.01); *G06F 8/41* (2013.01); *G06F 8/71* (2013.01); *H05K 999/99* (2013.01); *G06F 8/20* (2013.01); *G06F 8/60* (2013.01)

(58) Field of Classification Search
CPC .... G06F 8/41–8/433; G06F 8/71; G06F 8/20; G06F 8/60
See application file for complete search history.

(56) References Cited

U.S. PATENT DOCUMENTS

| 5,519,866 A | 5/1996 | Lawrence et al. |
| 5,848,274 A | 12/1998 | Hamby et al. |

(Continued)

OTHER PUBLICATIONS

Eduardo Santana de Almeida, Distributed Component-Based Software Development: An Incremental Approach, 2004, pp. 1-6. https://ieeexplore.ieee.org/stamp/stamp.jsp?tp=&arnumber=1342798 (Year: 2004).*

(Continued)

*Primary Examiner* — Mongbao Nguyen
(74) *Attorney, Agent, or Firm* — Steven L. Fisher-Stawinski; Steven F. McDaniel (57) ABSTRACT

A computer-implemented method includes receiving a set of complete source instructions to process a source code entity, an incremental build part, and a set of file definitions. The method analyzes the set of complete source instructions. The method identifies, from the set of analyzed source instructions, a set of operations that reference the incremental build subset. The method repeats: (i) determining, for each operation, whether any additional files are affected by the operation, the additional files forming a set of affected files; (ii) creating a combined set of files, the combined set of files consisting of the set of affected files and the incremental build subset; and (iii) updating the set of operations to include those from the analyzed source instructions that reference the combined set of files; until no new files are added to the combined set of files. The method generates a set of incremental source instructions.

6 Claims, 5 Drawing Sheets

(56) References Cited

U.S. PATENT DOCUMENTS

| | | | |
|---|---|---|---|
| 6,249,910 B1* | 6/2001 | Ju | G06F 8/433 717/146 |
| 6,430,708 B1 | 8/2002 | Evans | |
| 6,728,951 B1 | 4/2004 | Gibson et al. | |
| 7,133,894 B2* | 11/2006 | Banerjee | G06F 8/71 709/203 |
| 7,640,533 B1 | 12/2009 | Lottero | |
| 7,721,272 B2* | 5/2010 | Mockford | G06F 8/71 717/120 |
| 7,941,794 B2* | 5/2011 | Ozone | G06F 8/433 712/201 |
| 8,312,430 B2* | 11/2012 | Best | G06F 11/3688 717/120 |
| 8,495,598 B2* | 7/2013 | Gounares | G06F 9/44505 717/140 |
| 8,555,245 B2 | 10/2013 | Bouz et al. | |
| 8,745,585 B2* | 6/2014 | Watters | G06F 8/36 707/636 |
| 8,799,881 B2* | 8/2014 | Tojo | G06F 8/452 717/136 |
| 8,869,123 B2* | 10/2014 | Mykland | G06F 8/45 717/148 |
| 8,924,931 B2* | 12/2014 | Harding | G06F 8/71 717/121 |
| 8,930,899 B2* | 1/2015 | Chan | G06F 8/41 717/101 |
| 9,081,928 B2* | 7/2015 | Van Eijndhoven | G06F 8/456 |
| 9,152,400 B2 | 10/2015 | De Lima Ottoni | |
| 9,164,743 B2* | 10/2015 | Schmidt | G06F 8/4441 |
| 9,183,123 B2* | 11/2015 | Spektor | G06F 11/36 |
| 9,552,201 B2* | 1/2017 | Hyndman | G06F 8/658 |
| 9,665,849 B2* | 5/2017 | Casey | G06Q 10/103 |
| 9,720,685 B2* | 8/2017 | Novak | G06F 8/71 |
| 9,852,429 B2* | 12/2017 | Beardslee | G06F 8/20 |
| 2003/0177473 A1* | 9/2003 | Banerjee | G06F 8/71 717/115 |
| 2004/0194060 A1 | 9/2004 | Ousterhout | |
| 2005/0278708 A1 | 12/2005 | Zhao | |
| 2007/0168974 A1* | 7/2007 | Mockford | G06F 8/71 717/124 |
| 2007/0250826 A1 | 10/2007 | O'Brien | |
| 2010/0077387 A1* | 3/2010 | Callaghan | G06F 8/443 717/140 |
| 2010/0251024 A1* | 9/2010 | Gonzales, II | G06F 11/3664 714/32 |
| 2010/0293533 A1* | 11/2010 | Andrade | G06F 8/10 717/140 |
| 2012/0254836 A1 | 10/2012 | Storer | |
| 2012/0324417 A1* | 12/2012 | Somani | G06F 8/30 717/101 |
| 2013/0174122 A1* | 7/2013 | Watters | G06F 8/36 717/121 |
| 2013/0198717 A1 | 8/2013 | Igelka | |
| 2013/0311980 A1 | 11/2013 | Cabillic et al. | |
| 2014/0007062 A1* | 1/2014 | Schmidt | G06F 8/4441 717/156 |
| 2014/0007064 A1 | 1/2014 | Schmidt | |
| 2014/0115560 A1 | 4/2014 | Hutchison | |
| 2014/0123117 A1 | 5/2014 | Lee | |
| 2014/0258998 A1 | 9/2014 | Adl-Tabatabai | |
| 2014/0306964 A1 | 10/2014 | Reddish | |
| 2015/0248280 A1* | 9/2015 | Pillay | G06F 8/60 717/106 |
| 2015/0378697 A1* | 12/2015 | Sathyanathan | G06F 8/41 717/146 |
| 2016/0110417 A1 | 4/2016 | Lakshminarayan | |
| 2016/0154629 A1 | 6/2016 | Noens | |
| 2016/0253625 A1* | 9/2016 | Casey | G06Q 10/103 717/101 |

OTHER PUBLICATIONS

Ondrej Sery, Incremental Upgrade Checking by Means of Interpolation-based Function Summaries, 2012, pp. 114-121. https://ieeexplore.ieee.org/stamp/stamp.jsp?tp=&arnumber=6462563 (Year: 2012).*

Matthew Purver, Incremental Generation by Incremental Parsing: Tactical Generation in Dynamic Syntax, 2007, pp. 1-8. http://citeseerx.ist.psu.edu/viewdoc/download?doi=10.1.1.12.5653&rep=rep1&type=pdf (Year: 2007).*

James Law, Incremental Dynamic Impact Analysis for Evolving Software Systems, 2003, pp. 1-12. https://ieeexplore.ieee.org/stamp/stamp.jsp?tp=&arnumber=1251064 (Year: 2003).*

Fulton et al., "Incremental Buiild Generation", U.S. Appl. No. 14/933,182, filed Nov. 5, 2015, 27 pages.

IBM, List of IBM Patents or Patent Applications Treated as Related, Appendix P, dated Nov. 5, 2015, 2 pages.

Andritsos et al., "Software Clustering based on Information Loss Minimization", provided by the inventor on Dec. 30, 2013, 11 pages, <http://dblab.cs.toronto.edu/project/limbo/docs/wcre03.pdf>.

Chambers et al., "A Framework for Selective Recompilation in the Presence of Complex Intermodule Dependencies", 17th International Conference on Software Engineering (ICSE'17), Seattle, WA, Apr. 1995, pp. 1-10.

Yu et al., "Reducing Build Time Through Precompilations for Evolving Large Software", provided in search report, Nov. 25, 2013, pp. 1-14, <ftp://ftp.db.toronto.edu/cs/ftp/public_html/csrg-technical-reports/504/pccTR.pdf>.

Alexander Karmanov, Deploying Database Developments, 2008, pp. 1-43. https://www.red-gate.com/simp le-talk/sql/database-administration/deploying-database-developments/.

Gregorio Robles, Mining Large Software Compilations over Time: Another Perspective of Software Evolution, 2006, pp. 1-7. https://dl.acm.org/citation.cfm?id=1137986.

IBM, EGL Generation Guide, Rational Business Developer, 2008, pp. 37-115. https://www.ibm.com/developerworks/rational/cafe/attachments/1O13-3-1 7 40/com ibm.etools egl.gg pdf.doc.pdf.

* cited by examiner

INCREMENTAL BUILD GENERATION

BACKGROUND

The present invention relates generally to compilers and more generally to incrementally processing source code entities.

Source code entities depend on source code instructions. For example, large software applications depend, at compile time, on build instructions. In such embodiments, source code instructions like build instructions may be expressed in a control language to code a set of steps to build the software application. These steps may be sequential, parallel, or a combination of the two. Often a programmer may edit or want to change, remove, or add the source code. This change can affect the control language instructions such that the control language instructions need to be rebuilt. For building incremental modifications, programmers continue to face challenges efficiently identifying which parts of the control language instructions need to be modified and what modifications are required.

SUMMARY

A computer-implemented method includes receiving a set of complete source instructions to process a source code entity and referencing a set of files. The method receives one or more incremental build parts and a set of file definitions that identify an incremental build subset. The incremental build subset comprises the files that form the one or more incremental build parts. The method analyzes the set of complete source instructions to yield a set of analyzed source instructions, based on substituting all variables and expanding all procedures therein. The method identifies, from the set of analyzed source instructions, a set of operations. The set of operations are operations within the set of analyzed source instructions that reference the incremental build subset.

The method repeats: (i) determining, for each operation of the set of operations, whether any additional files are affected by the operation, the additional files forming a set of affected files; (ii) creating a combined set of files if the set of affected files have one or more elements, the combined set of files consisting of the set of affected files and the incremental build subset; and (iii) updating the set of operations to include those from the analyzed source instructions that reference the combined set of files; until no new files are added to the combined set of files. The method generates a set of incremental source instructions, based on said set of operations in combination with said set of complete source instructions, organized according to dependencies.

DETAILED DESCRIPTION

Figure 1:
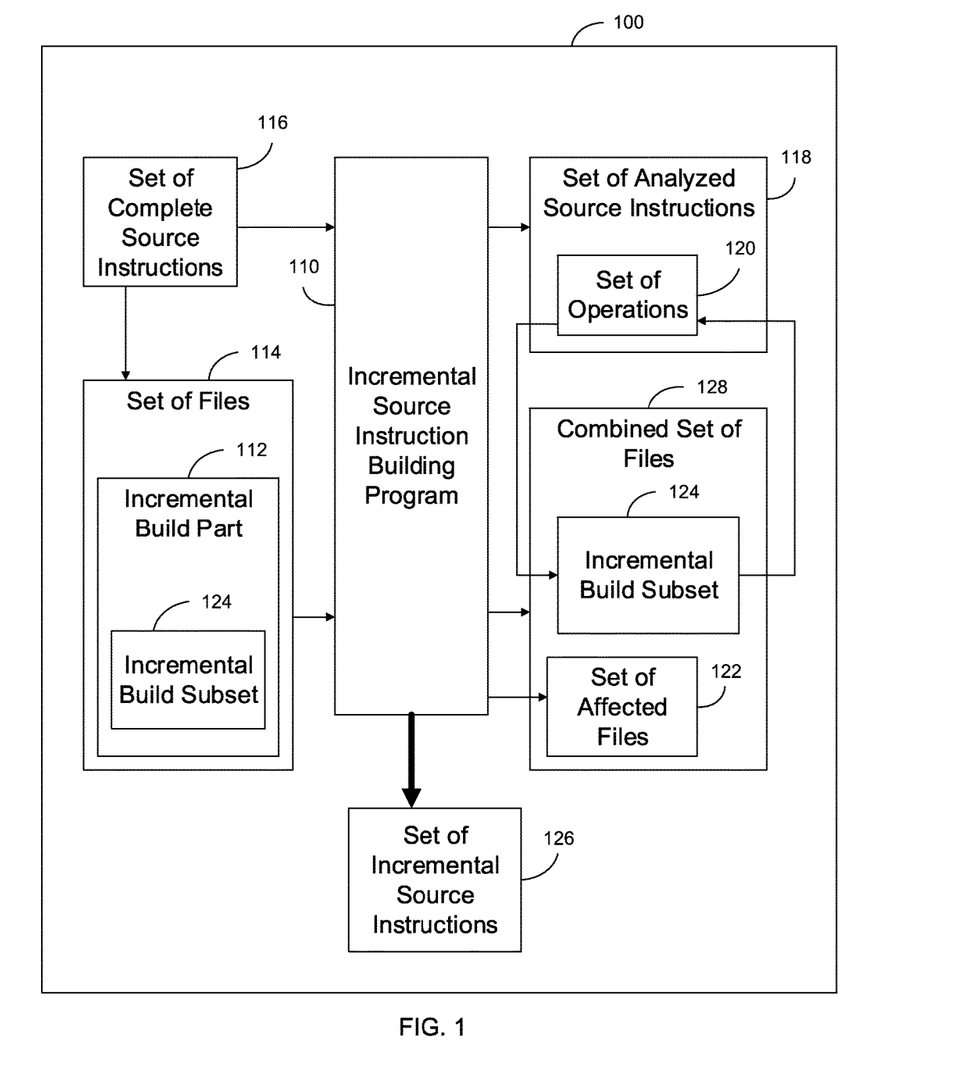
FIG. 1 is a block diagram of one embodiment of a computer system environment suitable for operation in accordance with at least one embodiment of the invention.

Referring now to the invention in more detail, FIG. 1 is a block diagram displaying an exemplary computer system environment suitable for operation of at least one embodiment of the invention. A computer system 100 includes an incremental source instruction building program 110, an incremental build part 112, a set of files 114, a set of complete source instructions 116, a set of analyzed source instructions 118, a combined set of files 128, and a set of incremental source instructions 126, all in mutual electronic communication and interconnected within the computer system 100.

The incremental source instruction building program 110 may generate the set of incremental source instructions 126 for use by an operating system to process a source code entity. In general, the set of complete source instructions 116 are used by an operating system to transform input into object code as output. In general, an operating system processes the source code entity to transform source instructions into another format, such as an object code. The operating system may generate the object code during a compiling step, a linking step, or a binding step.

For example, in embodiments where the source code entity is the source code for a software application, the incremental source instruction building program 110 generates the set of incremental source instructions 126 for use by the operating system during a compilation step of a software application build. A software application may be large, meaning it requires a complex build with a large number of files, functions, and actions being necessary to build the software application. Source instructions for the software applications to be compiled on IBM z/OS may be expressed using a job control language.

Job Control Language (JCL) is the job control language used on IBM® mainframe operating systems such as IBM z/OS for IBM z Systems. JCL instructs a system on how to run a batch job or start a subsystem. Application programmers may use JCL to code a sequence of steps, for example the set of complete source instructions 116. JCL defines input and output files used in each step in the set of complete source instructions 116. In some embodiments, a set of input and output file definitions are defined by the JCL and are stored in the set of files 114. JCL imposes a complete definition of files used in the sequence of steps. Other job control languages or makefile syntax do not impose a complete definition of files.

In embodiments where the source code entity is a software application, a software application program developer may edit a portion of the software application. This results in one or more modified source code files. The incremental source instruction building program 110 may generate the set of incremental source instructions 126, which form a script by which a the computer system may direct one or more compilers to build the incremental build part 112 and integrate the resulting incremental object code with unaffected object code to yield complete object code for the modified software application. The incremental source instruction building program 110 may receive the set of complete source instructions 116, the set of files 114, the incremental build part 112, and the incremental build subset 124 as input. The incremental source instruction building program 110 may generate the set of analyzed source instructions 118, the set of operations 120, the combined set of files 128, and the set of affected files 122 as intermediate output. The incremental source instruction building program 110 may generate the set of incremental source instructions 126 as output.

The set of complete source instructions 116 is the set of source code computer instructions to process a source code entity. The set of complete source instructions 116 is written in a job control language such as JCL, other job control languages, or makefile syntax. The set of complete source instructions 116 specify commands, procedures, functions, equations, and other actions as steps to be executed by an operating system to process a source code entity. In embodiments where the source code entity is a software application, the set of complete source instructions 116 are executed by a compiler to build the software application. The set of complete source instructions 116 may reference files, functions, values, equations, or procedures via calls, references, imports, variables, or other identifiers within the set of complete source instructions 116. The files, functions, equations, or other procedures referenced within the set of complete source instructions 116 are stored within the set of files 114.

The set of files 114 include the files, functions, values, equations, or other procedures that are referenced within the set of complete source instructions. The set of files 114 also includes a set of file definitions. The file definitions define how the files are referenced within the set of complete source instructions 116. The set of files 114 includes the incremental build part 112. In embodiments where the set of complete source instructions 116 is expressed in JCL, the set of files 114 may also include a set of definitions. The definitions may define how the files, functions, values, equations, or other procedures are referenced within the set of complete source instructions 116. In such embodiments the set of files 114 also indicates whether the files, functions, values, equations, or other procedures are input or output.

The incremental build part 112 may comprise a portion of the source code entity. In embodiments where the source code entity is a software application, the incremental build part 112 may comprise a portion of the software application source code. The incremental build part 112 may be an edited step or a series of edited steps within the set of complete source instructions 116. The incremental build subset 124 is the set of files, functions, values, equations, or other procedures that are referenced within the incremental build part 112. The incremental build subset 124 includes a set of file definitions to define how the files are referenced within the incremental build subset 124.

The incremental source instruction building program 110 receives the set of complete source instructions 116 and the set of files 114 as input and generates the set of analyzed source instructions 118 as intermediate output. The incremental source instruction building program 110 generates the set of analyzed source instructions 118 by substituting all variables and expanding all procedures within the set of complete source instructions 116. The incremental source instruction building program 110 generates the set of analyzed source instructions 118 by analyzing the set of complete source instructions 116. The incremental source instruction building program 110 applies the set of file definitions within the set of files 114 in substituting all variables and other references with the appropriate values. The result is that the set of analyzed source instructions 118 lacks any internal references and may be freely modified without breaking any reference or dependency.

For example, the set of complete source instructions 116 may reference a File A using a Variable A. In such an example, the set of files 114 includes a definition defining that Variable A references File A. The incremental source instruction building program 110 analyzes the set of complete source instructions 116 by replacing Variable A with File A to generate the set of analyzed source instructions 118. In another example, the set of complete source instructions 116 may reference a Function B. Instructions for the Function B may be contained within the set of files 114. The incremental source instruction building program 110 may generate the set of analyzed source instructions 118 by substituting the reference for Function B with the instructions for Function B contained within the set of files 114. In general, the set of analyzed source instructions 118 directly references files, functions, values, equations, and other procedures and not include variables or other indirect references. In general, the set of complete source instructions 116 contains at least one variable or other indirect reference.

The set of operations 120 is a subset of the set of analyzed source instructions 118. The incremental source instruction building program 110 differentiates the set of operations 120 from the set of analyzed source instructions 118 by referencing the incremental build subset 124. The set of operations 120 are the portion of the set of analyzed source instructions 118 that include the files, functions, values, equations, and other procedures included in the incremental build subset 124.

The set of affected files 122 are a subset of files from the set of files 114. The set of affected files 122 is an artefact generated by the incremental source instruction building program 110 based on the set of analyzed source instructions 118 and the set of operations 120. The incremental source instruction building program 110 generates the set of affected files 122 by identifying the files, functions, values, equations, and other procedures that are referenced in the same step as the steps that reference the set of operations 120. For example, a Step 1 may reference a Function B and a File C. The function B may be an element in the set of operations 120. In such an example, the incremental source instruction building program 110 adds the File C to the set of affected files 122.

The incremental source instruction building program 110 also generates as intermediate output the combined set of files 128. The combined set of files 128 is a set containing the incremental build subset 124 and the set of affected files 122.

Figure 2:
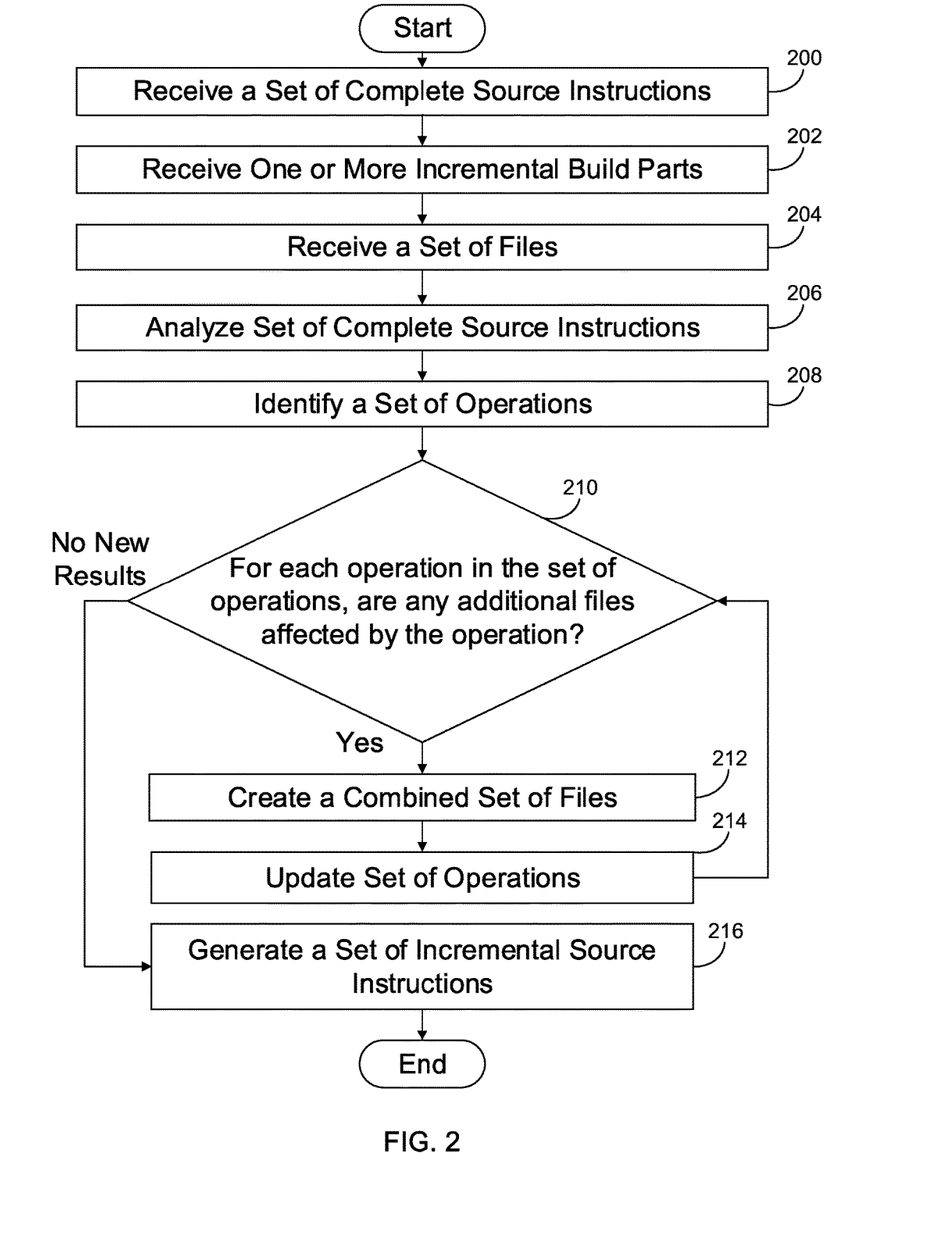
FIG. 2 is a flowchart depicting operational steps for a partial instructions building program in accordance with at least one embodiment of the invention.

FIG. 2 is a flowchart depicting the operational steps of the incremental source instruction building program 110 executing within the computer system of FIG. 1, in accordance with an embodiment of the present invention.

At step 200, the incremental source instruction building program 110 receives the set of complete source instructions 116. Receiving may include a user explicitly calling the incremental source instruction building program 110 from a command line interface using a reference to the incremental build part 112 as an argument. Alternatively, receiving may include automated calls to the incremental source instruction building program, for example from an integrated development environment or as part of a source code management system.

At step 202, the incremental source instruction building program 110 receives one or more incremental build parts, such as the incremental build part 112 via the computer system 100.

At step 204, the incremental source instruction building program 110 receives the set of files 114 via the computer system 100.

At step 206, the incremental source instruction building program 110 analyzes the set of complete source instructions 116 to generate the set of analyzed source instructions 118. Analyzing may include copying a referenced file into the variable where the reference file is referenced. Analyzing may include an inline expansion of all files, functions, values, equations, and other procedures.

At step 208, the incremental source instruction building program 110 identifies the set of operations 120, from within the analyzed source instructions, as defined above. The incremental source instruction building program 110 differentiates the set of operations 120 from the set of analyzed source instructions 118 by referencing the incremental build subset 124. The set of operations 120 are the portion of the set of analyzed source instructions 118 that include the files, functions, values, equations, and other procedures included in the incremental build subset 124.

At step 210, the incremental source instruction building program 110 considers each operation in the set of operations 120. For each operation in the set of operations 120 the incremental source instruction building program 110 identifies any additional files that are affected by the operation in the set of operations 120. Any operation within the set of operations 120 affects a file if the operation references the file. In some embodiments, the operation within the set of operations 120 affects a file by referencing the file in the same step as the operation. In some embodiments, the incremental source instruction building program 110 determines if a file is affected by an operation by identifying the operation within the set of analyzed source instructions 118 and identifying every file that is also referenced in the same step where the operation is referenced. At step 210, the incremental source instruction building program 110 makes this determination for each operation within the set of operations 120 to determine if a file has been affected.

If the incremental source instruction building program 110 identifies an additional file affected by the operation, the incremental source instruction building program 110 creates the combined set of files 128 at step 212. The incremental source instruction building program 110 creates the combined set of files 128 by creating a set of files that includes the affected files identified at step 210 and the incremental build subset 124. The incremental source instruction building program 110 received the incremental build subset 124 as a part of the set of files 114 at step 204.

At step 214 the incremental source instruction building program 110 updates the set of operations 120 to include any operations referenced in the set of affected files 122. For example, the set of operations 120 originally included operations A. Operation A references File B. File B is added to the set of affected files at step 212. File B is also referenced in Operation C. Operation C is added to the set of operations 120. The incremental source instruction building program 110 iterates this process (step 210-step 214) until no new affected files are found by the incremental source instruction building program 110. The incremental source instruction building program 110 may respond to and is responsive to no new affect files being found, repeating the step 210-step 214 and continuing to repeat the process until no new files are added to the set of operations 120.

When no new results are found at step 210, the incremental source instruction building program 110 proceeds to step 216. At step 216 the incremental source instruction building program 110 generates the set of incremental source instructions 126. The incremental source instruction building program 110 generates the incremental source instructions 126 using the combined set of files 128. The incremental source instruction building program 110 generates the incremental source instructions 126 using dependencies within the set of affected files and the set of complete source instructions 116. In some embodiments dependencies include whether the affected files are referenced by an operation in the set of operations 120. In such an embodiment, all files affected by the set of operations 120 is used by the incremental source instruction building program 110 to generate the set of incremental source instructions 126.

Figure 3:
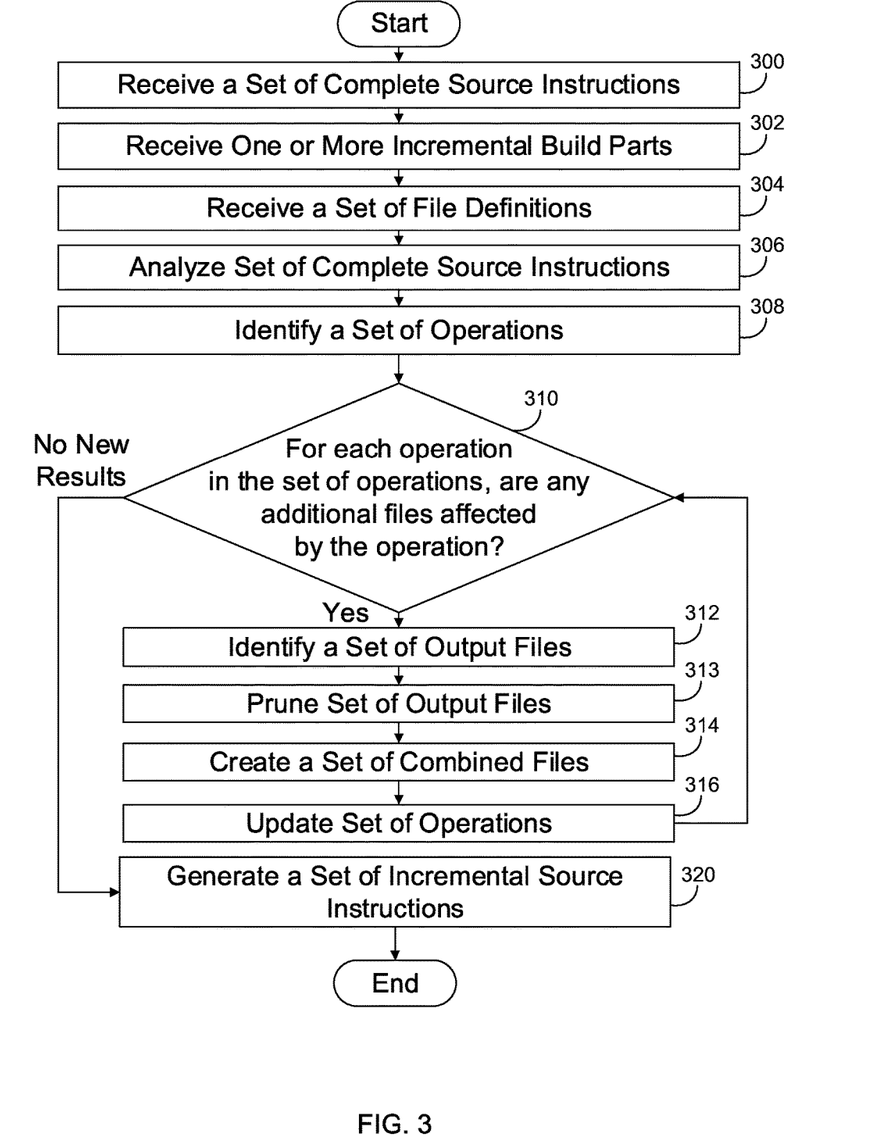
FIG. 3 is a flowchart depicting operational steps for a partial instructions building program that prunes a set of output files, in accordance with at least one embodiment of the invention.

FIG. 3 is a flowchart depicting the operational steps of the incremental source instruction building program 110 executing within the computer system of FIG. 1, in accordance with an embodiment of the present invention.

At step 300, the incremental source instruction building program 110 receives the set of complete source instructions 116. At step 300, the set of complete source instructions 116 are expressed in JCL.

The incremental source instruction building program 110 performs step 302, step 304, step 306, step 308, and step 310 in a way similar to the embodiment depicted in FIG. 2.

At step 312, the incremental source instruction building program 110 identifies a set of output files from within the set of affected files 122. In some embodiments the set of complete source instructions 116 are written in a computer language or one or more computer languages, such as IBM C, C++, COBOL, PLI, or HLASM compilers. In such an embodiments, certain output files have been previously identified by computer programmers as not being affected by the set of operations 120. JCL defines every input and output file referenced within the set of complete source instructions 116. In such embodiments, a definition includes identifying whether the file is an input file or an output file. In some embodiments the incremental source instruction building program 110 identifies a set of standard library files for the computer programming language being used to write the set of complete source instructions 116. In such an embodiment, a library file within the set of standard library files may be within the set of affected files 122.

For example, in C++, library files such as iostream.h, math.h, etc., are not affected by the set of operations 120 even if the library file is referenced by an operation in the set of operations 120, because the library file has not been modified by the user. In such an example, the incremental source instruction building program 110 identifies the library file as an output file. In other embodiments, output files are manually identified by a computer programmer.

At step 313, the incremental source instruction building program 110 prunes the set of output files generated at step 312 from the set of affected files 122 such that the set of affected files 122 does not include the set of output files but includes other files referenced or affected by the set of operations 120. At step 313, the incremental source instruction building program 110 acts to prune the set of output files. In some embodiments the incremental source instruction building program 110 performs step 313 by pruning the set of output files by removing the set of standard library files for the computer programming language being used to write the set of complete source instructions 116.

At step 314, the incremental source instruction building program 110 creates the combined set of files 128. The combined set of files 128 includes the set of affected files 122 that were pruned at step 313 and the incremental build subset 124.

At step 316, the incremental source instruction building program 110 updates the set of operations to include operations referenced by the set of affected files 122 that were pruned at step 313. The incremental source instruction building program 110 iterates this process (step 310-step 316) until no new affected files are found by the incremental source instruction building program 110.

When no new results are found at step 310, the incremental source instruction building program 110 proceeds to step 320. At step 320 the incremental source instruction building program 110 generates the set of incremental source instructions 126. The incremental source instruction building program 110 generates the incremental source instructions 126 using the combined set of files 128 which includes the set of affected files 122 which were pruned at step 313, and the incremental build subset 124. The incremental source instruction building program 110 generates the incremental source instructions 126 using dependencies within the set of affected files and the set of complete source instructions 116.

Figure 4:
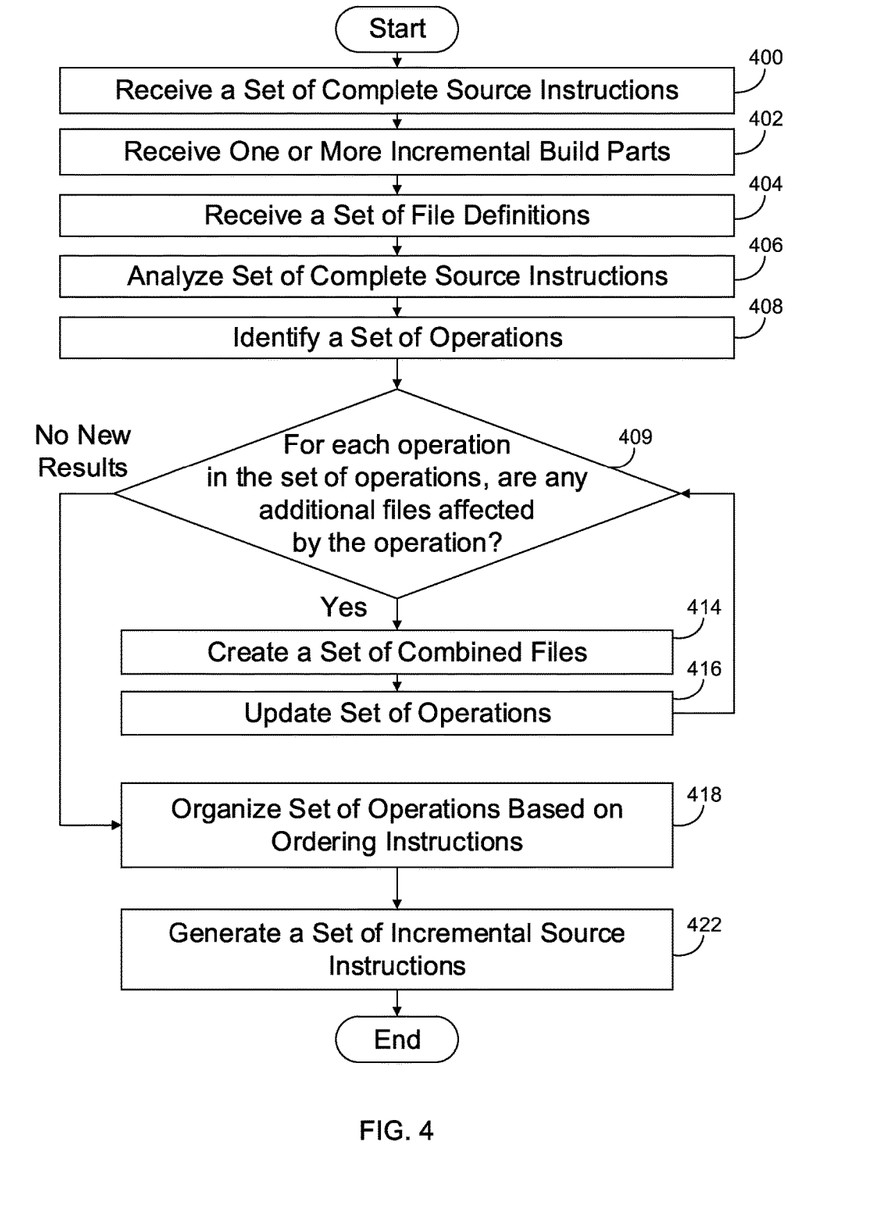
FIG. 4 is a flowchart depicting operation steps of a partial instructions building program wherein the partial instructions are organized based on ordering instructions, in accordance with at least one embodiment of the invention.

FIG. 4 is a flowchart depicting the operational steps of the incremental source instruction building program 110 executing within the computer system of FIG. 1, in accordance with an embodiment of the present invention.

At step 400, the incremental source instruction building program 110 receives the set of complete source instructions 116. At step 400, the set of complete source instructions 116 includes a set of ordering instructions to build the source code entity (not shown). In other embodiments, the order of operations may not affect the build of the source code entity. In other embodiments, the operations may be performed in parallel rather than sequentially such that the operations are order independent. In the embodiment in FIG. 4, the set of complete source instructions 116 includes sequential ordering instructions for at least a portion of the set of complete source instructions 116.

The incremental source instruction building program 110 performs step 402, step 404, step 406, step 408, step 409, step 414, and step 416 in a way similar to the embodiment depicted in FIG. 2.

At step 418 the incremental source instruction building program 110 organizes the set of operations and files referenced based on the ordering instructions. For example, the incremental source instruction building program 110 may identify an earliest step within the set of complete source instructions 116 where a particular operation occurs. The incremental source instruction building program 110 may identify the files referenced in the earliest step. The incremental source instruction building program 110 may identify the file references that occur within the set of analyzed source instructions 118, but not include the file references that occur before the earliest step in the set of complete source instructions 116. The incremental source instruction building program 110 performs step 418 by organizing the set of affected files using the file order within the set of complete source instructions 116 to generate a set of organized operations.

At step 422, the incremental source instruction building program 110 generates the set of incremental source instructions 126 using the combined set of files 128 and the ordering organization of the set of affected files 122 that took place at step 418.

The computer system 100 may be a management server, a web server, or any other electronic device or computing system capable of processing program instructions, receiving data and sending data. The computer system 100 may be a physical or virtual server computer, a laptop computer, a tablet computer, personal computer (PC), desktop computer, or any programmable electronic device capable of communicating with the incremental build part 112, the set of files 114, the set of complete source instructions 116, the incremental source instruction building program 110, the set of analyzed source instructions 118, the set of operations 120, the combined set of files 128, the set of affected files 122, the incremental build subset 124, and the set of incremental source instructions 126. In some embodiments, computer system 100 is a server computing system utilizing multiple computers as a server system, such as in a cloud computing environment. In some embodiments, the computer system 100 represents a computer system utilizing clustered computers and components to act as a single pool of seamless resources. The Computer System 100 may include components, as depicted and described in further detail with respect to FIG. 5. In some embodiments, the computer system 100 may include registries, repositories, or programs (not shown).

The incremental source instruction building program 110 may be any program, list, database, or any other system capable of receiving one or more incremental build parts, such as the incremental build part 112, the set of files 114, the set of complete source instructions 116, the combined set of files 128, the set of analyzed source instructions 118, the set of operations 120, the set of affected files 122, or the incremental build subset 124 and generating the set of incremental source instructions 126, the set of analyzed source instructions 118, the set of operations 120, the combined set of files 128, the set of affected files 122, or the incremental build subset 124. The incremental source instruction building program 110 may be a dedicated client incremental source instructions building program, a function integrated within another program, or any other program or function that can communicate with the incremental build part 112, the set of files 114, the set of complete source instructions 116, the combined set of files 128, the set of analyzed source instructions 118, the set of operations 120, the set of affected files 122, or the incremental build subset 124 and generate the set of incremental source instructions 126, the set of analyzed source instructions 118, the set of operations 120, the combined set of files 128, the set of affected files 122, or the incremental build subset 124.

Figure 5:
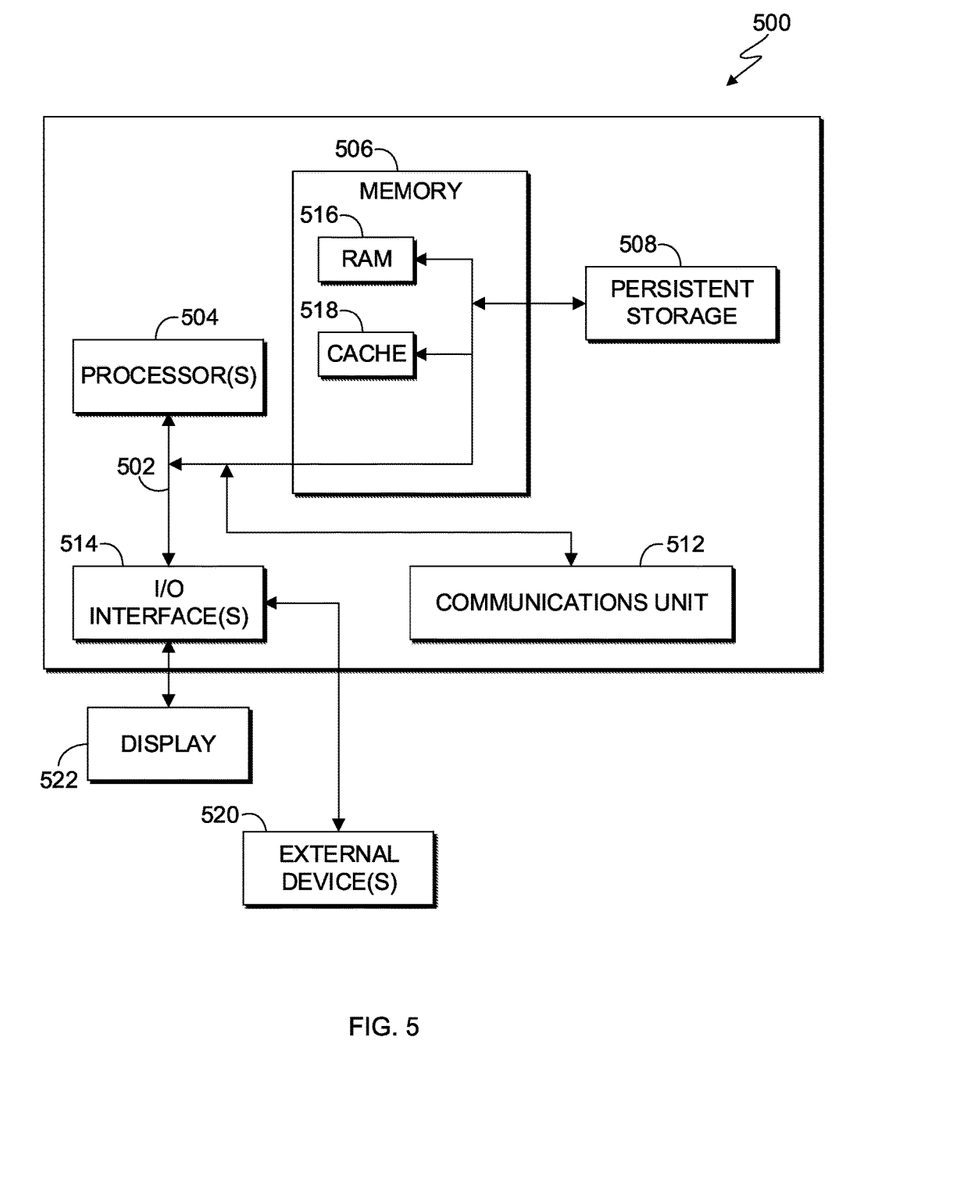
FIG. 5 is a block diagram of a computing apparatus suitable for executing the partial instructions building program in accordance with at least one embodiment of the present invention.

FIG. 5 is a block diagram depicting components of a computer 500 suitable for executing the incremental source instruction building program 110. FIG. 5 displays the computer 500, the one or more computer processor(s) 504 (including one or more computer processors), the communications fabric 502, the memory 506, the RAM 516, the cache 518, the persistent storage 508, the communications unit 512, the I/O interface(s) 514, the display 522, and the external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the computer processor(s) 504, memory 506, persistent storage 508, communications unit 512, and input/output (I/O) interface(s) 514. The communications fabric 502 may be implemented with any architecture suitable for passing data or control information between the computer processor(s) 504 (e.g. microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a random access memory (RAM) 516 and a cache 518. In general, the memory 506 may comprise any suitable volatile or non-volatile one or more computer readable storage media.

Program instructions for the incremental source instruction building program 110 may be stored in the persistent storage 508, or more generally, any computer readable storage media, for execution by one or more of the respective computer processor(s) 504 via one or more memories of the memory 506. The persistent storage 508 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 may comprise one or more network interface cards. The communications unit 512 may provide communications through the use of either or both physical and wireless communications links. In the context of some embodiments of the present invention, the source of the various input data may be physically remote to the computer 500 such that the input data may be received and the output similarly transmitted via the communications unit 512.

The I/O interface(s) 514 allow for input and output of data with other devices that may operate in conjunction with the computer 500. For example, the I/O interface(s) 514 may provide a connection to the external devices 520, which may be as a keyboard, keypad, a touch screen, or other suitable input devices. External devices 520 may also include portable computer readable storage media, for example thumb drives, portable optical or magnetic disks, and memory cards. Software and data used to practice embodiments of the present invention may be stored on such portable computer readable storage media and may be loaded onto the persistent storage 508 via the I/O interface(s) 514. The I/O interface(s) 514 may similarly connect to a display 522. The display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising:
one or more non-transitory computer readable storage media and program instructions stored on one or more non-transitory computer readable storage media for execution by one or more computer processors, the program instructions comprising instructions to perform:
receiving a set of source code build instructions for building a complete software entity, the set of source code build instructions referencing a set of source code files corresponding to the complete software entity;
substituting all variables and expanding all procedures within the set of source code build instructions to produce analyzed source code build instructions for the complete software entity;
determining an incremental build subset for the set of source code files, wherein the incremental build subset comprises source code files that have changed since a previous build;
determining operations within the analyzed source code build instructions that reference files within the incremental build subset to produce a set of incremental operations;
determining a set of affected files corresponding to the set of incremental operations; and
generating a set of incremental source code build instructions, based on the set of incremental operations and the set of affected files;
wherein the set of source code build instructions includes a set of ordering instructions;
wherein the program instructions comprise instructions to organize the set of incremental operations based on the set of ordering instructions to generate a set of organized operations; and
wherein the set of incremental source code build instructions is based on the set of organized operations in combination with the set of source code build instructions, organized according to dependencies.

2. The computer program product of claim 1, wherein the set of source code build instructions is expressed in a job control language.

3. The computer program product of claim 1, wherein the program instructions comprise instructions to perform:
identifying, within the set of affected files, a set of standard library files for one or more computer languages in which the set of source code build instructions is expressed; and
removing the set of standard library files from the set of affected files.

4. A computer system comprising:
one or more computer processors;
one or more non-transitory computer readable storage media;
computer program instructions;
the computer program instructions being stored on one or more non-transitory computer readable storage media for execution by at least one of the one or more computer processors, the computer program instructions comprising instructions to perform:
receiving a set of source code build instructions for building a complete software entity, the set of source code build instructions referencing a set of source code files corresponding to the complete software entity;
substituting all variables and expanding all procedures within the set of source code build instructions to produce analyzed source code build instructions for the complete software entity;
determining an incremental build subset for the set of source code files, wherein the incremental build subset comprises source code files that have changed since a previous build;

determining operations within the analyzed source code build instructions that reference files within the incremental build subset to produce a set of incremental operations;
determining a set of affected files corresponding to the set of incremental operations; and
generating a set of incremental source code build instructions, based on the set of incremental operations and the set of affected files;
wherein the set of source code build instructions includes a set of ordering instructions;
wherein the program instructions comprise instructions to organize the set of incremental operations based on the set of ordering instructions to generate a set of organized operations; and
wherein the set of incremental source code build instructions is based on the set of organized operations in combination with the set of source code build instructions, organized according to dependencies.

5. The computer system of claim 4, wherein the set of source code build instructions is expressed in a job control language.

6. The computer system claim 4, wherein the program instructions comprise instructions to perform:
identifying, within the set of affected files, a set of standard library files for one or more computer languages in which the set of source instructions is expressed; and
removing the set of standard library files from the set of affected files.

* * * * *